R. D. NYE.
FURNACE VALVE.
APPLICATION FILED DEC. 29, 1920.
1,411,297.
Patented Apr. 4, 1922.
4 SHEETS—SHEET 1.
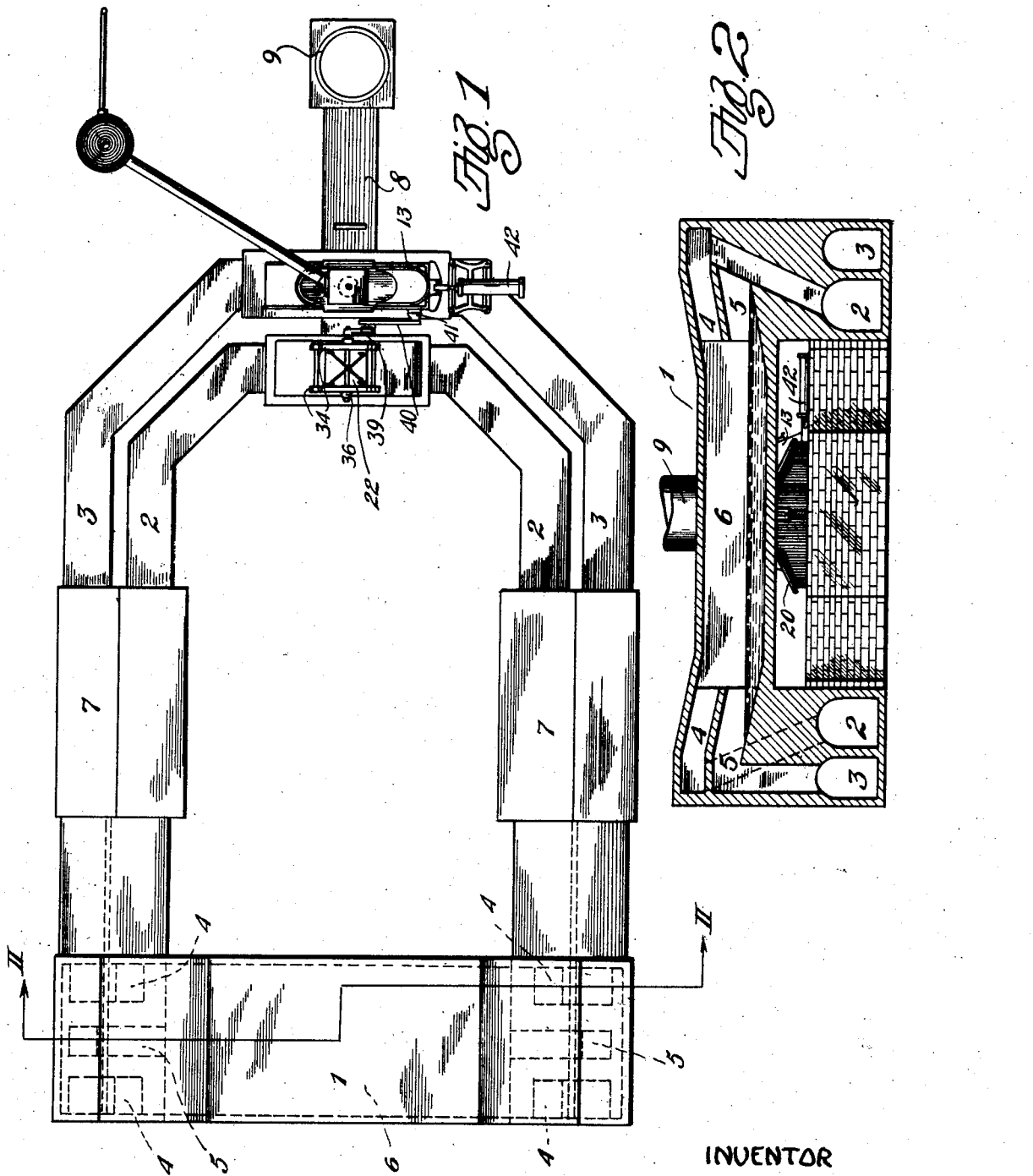
INVENTOR
R.D. Nye
BY: Frease, Merkel, Saywell and Bond
ATTYS.

R. D. NYE.
FURNACE VALVE.
APPLICATION FILED DEC. 29, 1920.
1,411,297.
Patented Apr. 4, 1922.
4 SHEETS—SHEET 2.
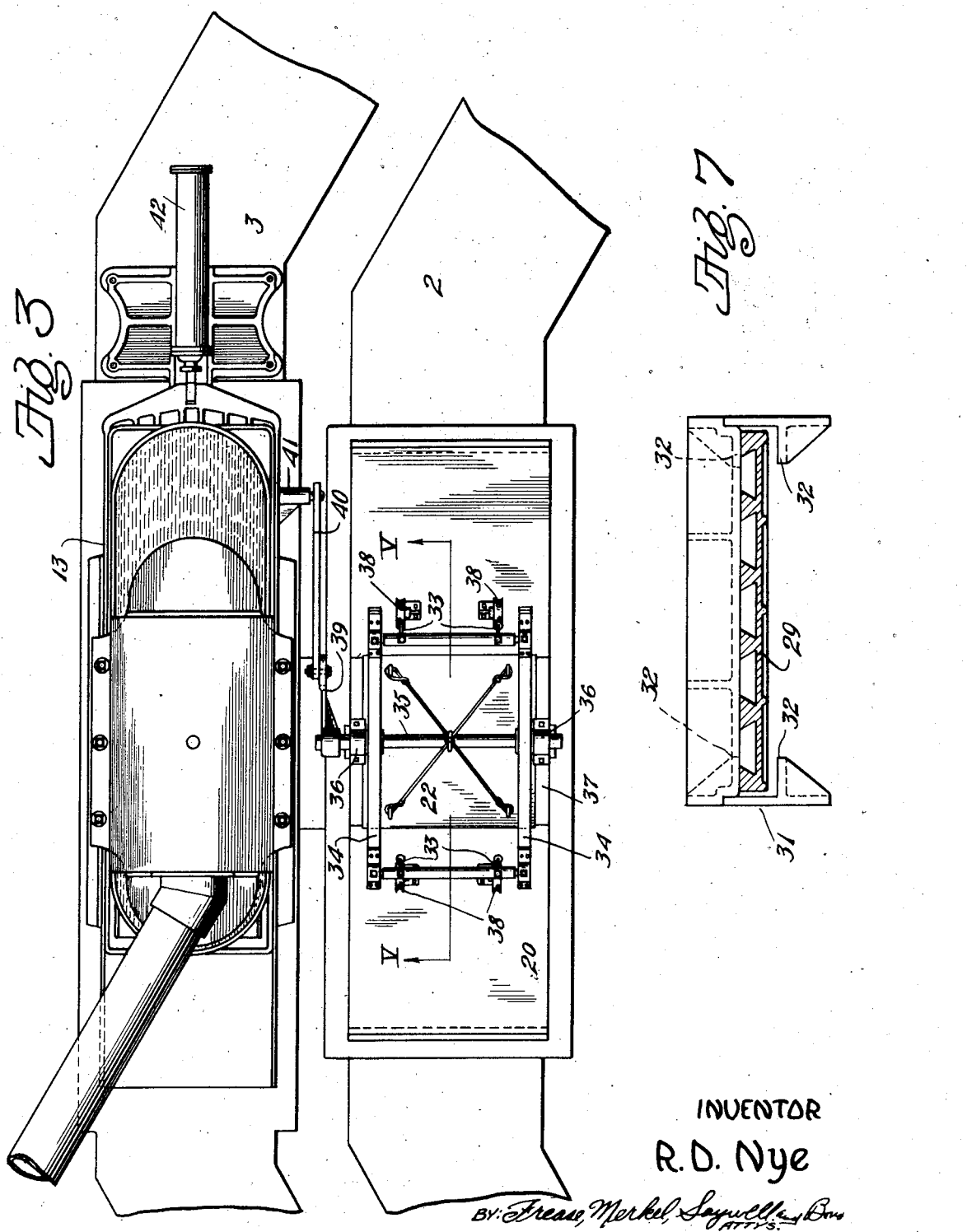
INVENTOR
R.D. Nye

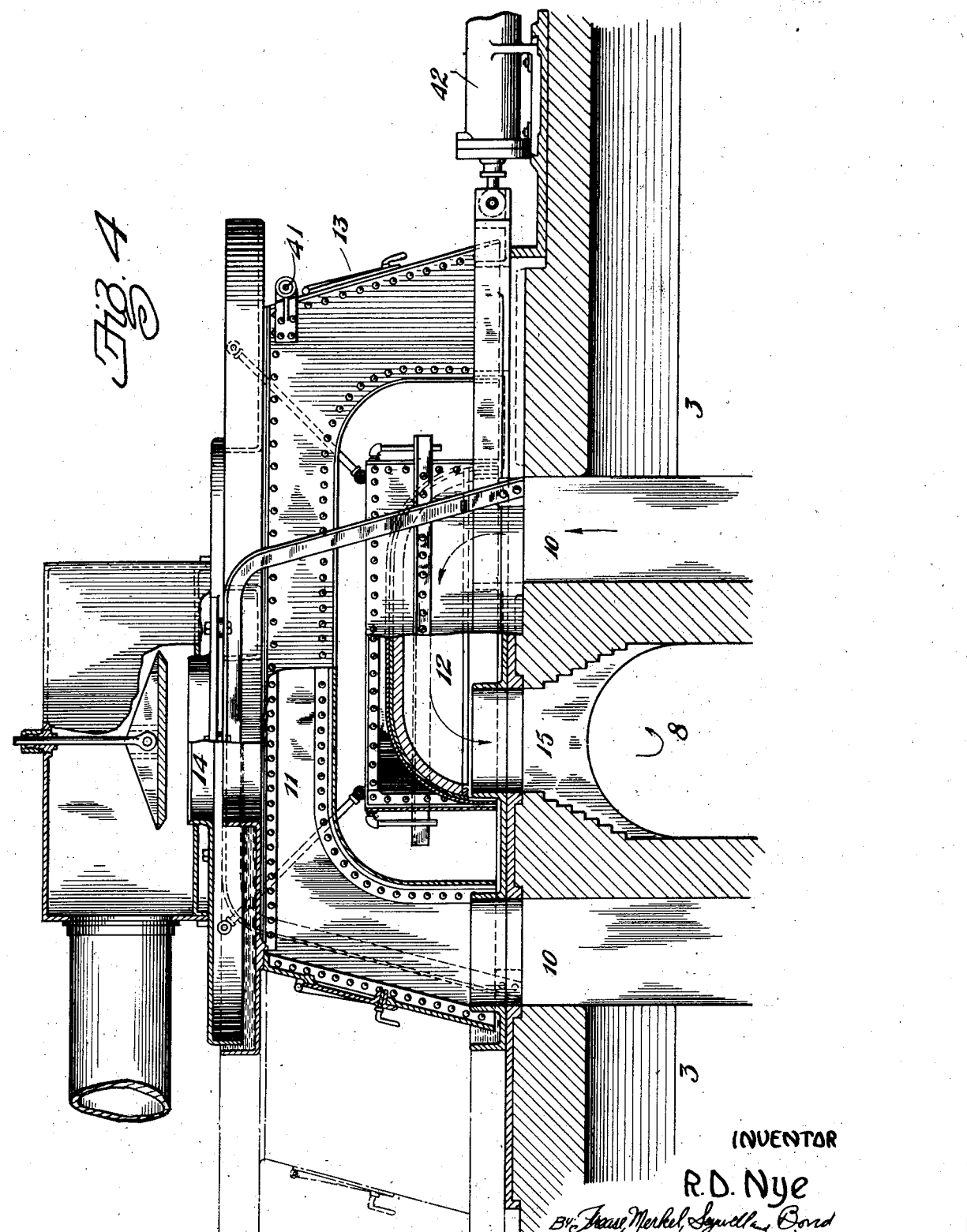

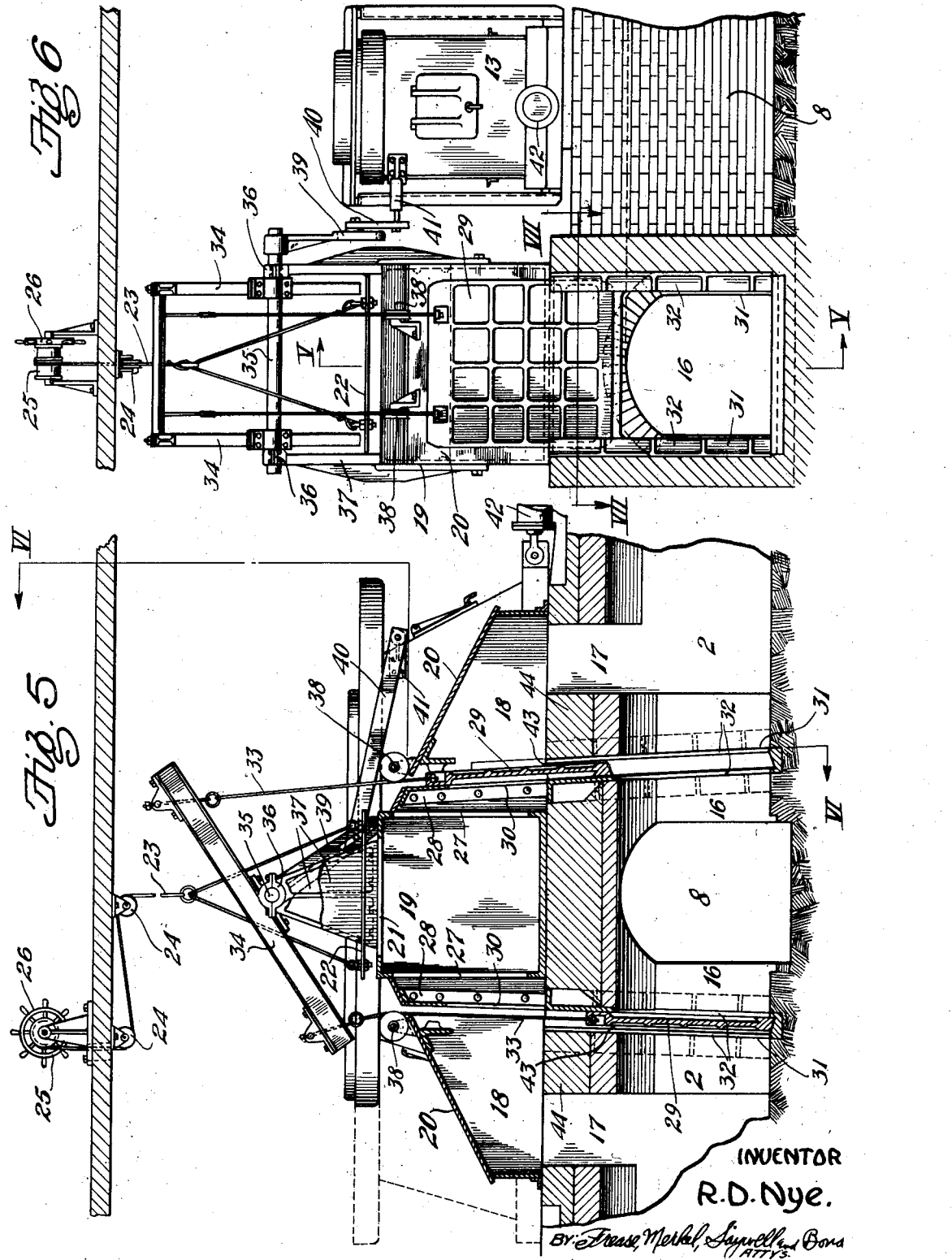

UNITED STATES PATENT OFFICE.

RALPH D. NYE, OF CANTON, OHIO.

FURNACE VALVE.

1,411,297.  Specification of Letters Patent.  Patented Apr. 4, 1922.

Application filed December 29, 1920. Serial No. 433,888.

*To all whom it may concern:*

Be it known that I, RALPH D. NYE, a citizen of the United States, and resident of Canton, in the county of Stark and State of Ohio, have invented certain new and useful Improvements in Furnace Valves, of which the following is a specification.

The invention relates to open hearth furnaces of the regenerative type, wherein gas and air are received at one end and discharged from the other end of the furnace through companion tunnels having regenerators therein, the tunnels having common sources of gas and air supply and a common chimney flue outlet; and the object is to provide improved construction, arrangement and operation of the valves for controlling and reversing the flow of air through the furnace and regenerators.

The flow of gas into and out of furnaces of this type may be controlled by a Schild reversing valve, which places the respective gas tunnels alternately in communication with the gas supply and the chimney flue; and to obtain best results, it is desirable, if not necessary, to coordinate the operation of the air valves with the action of the gas valve, to admit the air into both tunnels through a common inlet and to provide straightway free passage for the air into the tunnels through the chimney flue so that the amount of air and gas will be properly proportioned and a precipitation of dust at the air entrance end of the chimney flue prevented.

Such a control of the air is attained by leading the air tunnel through a straightway portal into the side of the chimney flue, by providing a common air box above the air entrance to the chimney flue, with air ports leading therefrom to the respective air tunnels, and providing a pair of reciprocating gate valves, for alternately closing the air ports, and the corresponding tunnels between the air ports and the chimney flue. A further advantage is attained by using a portion of the incoming air for cooling the corresponding air valve.

A practical embodiment of the invention is illustrated in the accompanying drawings forming part hereof in which—

Figure 1 is a plan view of a regenerative furnace showing the general arrangement of the gas and air valves and tunnels.

Fig. 2, a section of the furnace on line II—II, Fig. 1;

Fig. 3, an enlarged plan of the gas and air valves;

Fig. 4, a side elevation, partly in section, of the gas valve;

Fig. 5, an elevation section, on line V—V, Figs. 3 and 6; of the air valves, ports and tunnels;

Fig. 6, an end elevation of the gas and air valve mechanism, showing a section of one air-tunnel on line VI—VI, Fig. 5;

Fig. 7, a transverse section of one air valve on line VII—VII, Fig. 6.

Similar numerals refer to similar parts throughout the drawings.

An ordinary open hearth furnace 1 is built with air tunnels 2 and gas tunnels 3, at each end, with air channels 4, and gas channels 5, communicating with the respective ends of the open hearth chamber 6 of the furnace.

The respective tunnels extend through regenerators 7, and leading to the common chimney flue 8 opening through a straightway portal into the bottom of the chimney stack 9, by means of which an induced draft is created for moving air and gas one way or another through the furnace.

The ends of the gas tunnels 3, are provided with upward openings 10, at opposite sides of the chimney flue 8, for registering alternately with the inverted U inlet port 11, and the inverted V outlet port 12 of the Schild gas valve 13, by operation of which the gas tunnels are each placed alternately in communication with the valved gas inlet 14 and the upward opening 15 in the chimney flue 8, in well known manner, for reversing the flow of gas through the tunnels, the regenerator and the furnace.

The air tunnels 2, open straightway at 16, into the sides of the chimney flue at the inner end thereof, as clearly shown in Fig. 5, and are also provided with the upward ports 17, opening from below, into the air chambers 18, at the sides of the air box 19; the air box and chambers being formed by the housing 20 over the air inlet end of the chimney flue 8.

The inlet opening 21 is formed in the top of the air box 19, and may be closed by the plate valve 22 carried by the cable 23 passing around idle sheaves 24 to the winding drum 25 having a pilot wheel 26 thereon, by means of which the plate valve 22 may be raised or lowered to vary the amount of air admitted through the inlet 21 into the air box 19.

The air box 19 is provided with free openings 27 communicating with the chambers 18, and partition frames 28 are provided in the air chambers adjacent to the side of the air box, each forming a seat against which the rims of the gate valves 29 are adapted to rest for closing the openings 30, in the partition frames for stopping the passage of air between the air box 19 and the air ports 17.

Cross-frames 31 are provided in the walls of the air tunnel adjacent to the chimney flue and have flanges 32 forming seats for the rims of the gate valves 29, in alinement with the valve seats formed by the partition frames 28. The planes of the valve seats are inclined slightly inward from the bottom of the air tunnels to the top of the air housing, and the gate valves are so supported that they will bear by gravity upon the respective seats for stopping the passage of air.

The gate valves 29, are preferably supported and operated by cables 33, secured to the ends of a rocking beam 34, mounted at the middle upon a rock shaft 35 journalled in bearings 36 on the brackets 37 extending upward from the sides of the air housing 20; suitable sheaves 38 being provided on the top of the housing for guiding the lower portions of the cables parallel to the plane of the valve seats.

The air valves 29, may be operatively connected with the gas valve 13 by means of a crank arm 39 on the rock shaft 35, and a connecting bar 40 pivotally connected at one end to the crank arm and at the other end to a bracket 41 secured to the wall of the gas valve 13; so that when the gas valve is operated to and fro as by means of a hydraulic cylinder 42, the operation of the air valves will be coordinated with that of the gas valve.

The parts are so arranged that when one air valve 29 is dropped downward to close the opening 16 of one air tunnel 2 into the chimney flue 8, the other air valve 29 will be raised to close the opening 30 leading from the air box 19 to the corresponding air port 17 communicating with the other air tunnel 2, which position of the valves gives a wide open communication from the air box 19 through the port 17 into the one air tunnel 2, and also wide open direct communication from the other air tunnel 2 into the chimney flue 8, so that the induced draft of the stack will circulate the air to the furnace through the one tunnel 2, and from the furnace through the other tunnel 2, and it is evident that this circulation will be reversed by operating one valve 29 upward and the other valve 29 downward.

The cross-frames 31 in the tunnels 2 are designed to leave a slight interval 43 between the back of each valve and the adjacent roof wall 44 of the tunnel, through which interval a portion of the incoming air passes and cools the valve during each corresponding operation of the furnace and the free and direct communication 16 between each air tunnel 2 into the side of the chimney flue 8, causes the flow of air from the tunnel through the straightway portal into the flue to scour the entrance of the flue and prevent the accumulation of dust therein.

I claim:—

1. A regenerative furnace or the like including a chimney flue, an adjacent air box on the flue, air tunnels with straightway portals to the flue, air ports between the box and the tunnel, a valve alternately closing the port and opening the portal of one tunnel, and a valve alternately opening the port and closing the portal of the other tunnel.

2. A regenerative furnace or the like including a chimney flue, an adjacent air box, air tunnels with portals to the flue, air ports between the box and the tunnels, a valve alternately closing the port and opening the portal of one tunnel, and a valve alternately opening the port and closing the portal on the other flue, there being an interval back of each valve for the passage of cooling air.

3. A regenerative furnace or the like including a chimney flue, an adjacent air box, air tunnels with portals to the flue, air ports between the box and the tunnels, coplaner valve seats in the ports and portals, and a pair of reciprocating valves slidable on the seats alternately closing the port and opening the portal of one tunnel, and alternately opening the port and closing the portal of the other tunnel.

4. A regenerative furnace or the like including a chimney flue, an adjacent air box, air tunnels with straightway portals to the flue, air ports between the box and tunnels, inclined coplanar valve seats in the ports and portals, and a pair of reciprocating valves slidably bearing on the seats alternately closing the port and opening the portal of one tunnel, and opening the port and closing the portal of the other tunnel.

5. A regenerative furnace or the like including a chimney flue, a gas valve on the flue, gas tunnels communicating with the gas valves, an adjacent air box on the flue, air tunnels with straightway portals to the flue, air ports between the box and the tunnels, reciprocating valves alternately closing the port and opening the portal of one tunnel and opening the port and closing the portal of the other tunnel, and connections between the air valves and the gas valve actuating the former by the movements of the latter.

6. A regenerative furnace or the like including a chimney flue, an adjacent air box, an air tunnel with a straightway portal to the flue, an air port between the air box and the tunnel, and a reciprocating valve alternately closing the air port and opening the portal.

7. A regenerative furnace or the like including a chimney flue, an adjacent air box, an air tunnel with a portal to the flue, an air port between the box and the tunnel, and a reciprocating valve alternately closing the port and opening the portal of one flue, there being an interval back of the valve for the passage of cooling air.

RALPH D. NYE.